(12) United States Patent
Plant

(10) Patent No.: US 11,457,683 B2
(45) Date of Patent: Oct. 4, 2022

(54) ENERGY ABSORBING SYSTEMS

(71) Applicant: Rheon Labs Ltd., London (GB)

(72) Inventor: Daniel James Plant, London (GB)

(73) Assignee: RHEON LABS LIMITED, London (GB)

( * ) Notice: Subject to any disclaimer, the term of this patent is extended or adjusted under 35 U.S.C. 154(b) by 0 days.

(21) Appl. No.: 16/803,195

(22) Filed: Feb. 27, 2020

(65) Prior Publication Data

US 2020/0359728 A1  Nov. 19, 2020

Related U.S. Application Data

(63) Continuation of application No. PCT/GB2018/052425, filed on Aug. 28, 2018.

(30) Foreign Application Priority Data

Aug. 29, 2017 (GB) ...................................... 1713840

(51) Int. Cl.
*A42B 3/12* (2006.01)
*F16F 3/087* (2006.01)
(Continued)

(52) U.S. Cl.
CPC ............ *A42B 3/128* (2013.01); *A41D 13/015* (2013.01); *A41D 13/0531* (2013.01);
(Continued)

(58) Field of Classification Search
CPC ........... A42B 3/128; A42B 3/124; A42B 3/06; B32B 3/12; B32B 2571/00; B32B 7/022;
(Continued)

(56) References Cited

U.S. PATENT DOCUMENTS 5,918,309 A * 7/1999 Bachner, Jr. ......... A41D 31/245
428/116
2002/0145298 A1 10/2002 Williams et al.
(Continued)

FOREIGN PATENT DOCUMENTS

CA 2996099 A1 3/2017
CN 1897836 A 1/2007
(Continued)

OTHER PUBLICATIONS

Written Opinion for PCT Application No. PCT/GB2018/052425 dated Jul. 3, 2019, 9 pages.
(Continued)

*Primary Examiner* — Frank J Vineis
*Assistant Examiner* — Donald M Flores, Jr.
(74) *Attorney, Agent, or Firm* — Dinsmore & Shohl LLP; Nicholas R. Transier

(57) ABSTRACT

The present disclosure relates to flexible energy absorbing systems and body armor, helmets and protective garments incorporating flexible energy absorbing systems. A flexible energy absorbing system may comprise a first plurality of cells having a first re-entrant geometry and a second plurality of cells having a second, different geometry. The first plurality of cells and the second plurality of cells may comprise an elastomeric material.

24 Claims, 15 Drawing Sheets

(51) Int. Cl.
*A41D 13/05* (2006.01)
*A41D 13/06* (2006.01)
*A41D 13/015* (2006.01)
*B32B 3/12* (2006.01)
*B32B 7/022* (2019.01)
*B32B 3/08* (2006.01)
*B32B 5/02* (2006.01)

(52) U.S. Cl.
CPC .............. *A41D 13/065* (2013.01); *B32B 3/12* (2013.01); *F16F 3/0873* (2013.01); *B32B 3/085* (2013.01); *B32B 5/02* (2013.01); *B32B 7/022* (2019.01); *B32B 2437/04* (2013.01); *B32B 2571/00* (2013.01); *F16F 2224/025* (2013.01); *F16F 2226/04* (2013.01); *Y10T 428/24149* (2015.01); *Y10T 428/24992* (2015.01)

(58) Field of Classification Search
CPC ....... B32B 3/085; B32B 5/02; B32B 2437/04; A41D 13/015; A41D 13/0531; A41D 13/065; A41D 13/06; F16F 3/0873; F16F 2224/025; F16F 2226/04; Y10T 428/24149; Y10T 428/24992
See application file for complete search history.

(56) References Cited

U.S. PATENT DOCUMENTS

| | | |
|---|---|---|
| 2003/0167910 A1 | 9/2003 | Strait |
| 2010/0003431 A1 | 1/2010 | Raybuck |
| 2014/0007322 A1 | 1/2014 | Marz et al. |
| 2015/0101899 A1 | 4/2015 | Russo |
| 2016/0245358 A1 | 8/2016 | Plant |
| 2016/0255898 A1 | 9/2016 | Cormier et al. |
| 2016/0353825 A1* | 12/2016 | Bottlang ................ B33Y 80/00 |

FOREIGN PATENT DOCUMENTS

| | | |
|---|---|---|
| EP | 3050449 A | 8/2016 |
| GB | 201602151 | 3/2016 |
| GB | 2541760 A | 3/2017 |
| WO | 2010076257 A2 | 7/2010 |
| WO | 2012109381 A1 | 8/2012 |
| WO | 2013026077 A1 | 2/2013 |
| WO | 2015177747 A1 | 11/2015 |
| WO | 2016179601 A1 | 11/2016 |

OTHER PUBLICATIONS

International Search Report for PCT Application No. PCT/GB2018/052425 dated Jul. 3, 2019, 7 pages.
GB Application No. 1713840.5, Examination Report dated Jul. 30, 2021, 2 pages.
GB Application No. 1713840.5, Search Report and Examination Opinion dated Feb. 26, 2019, 4 pages.
First Office Action for Chinese Patent Application No. 20180063450.1, dated Apr. 14, 2022, 17 pages.

\* cited by examiner

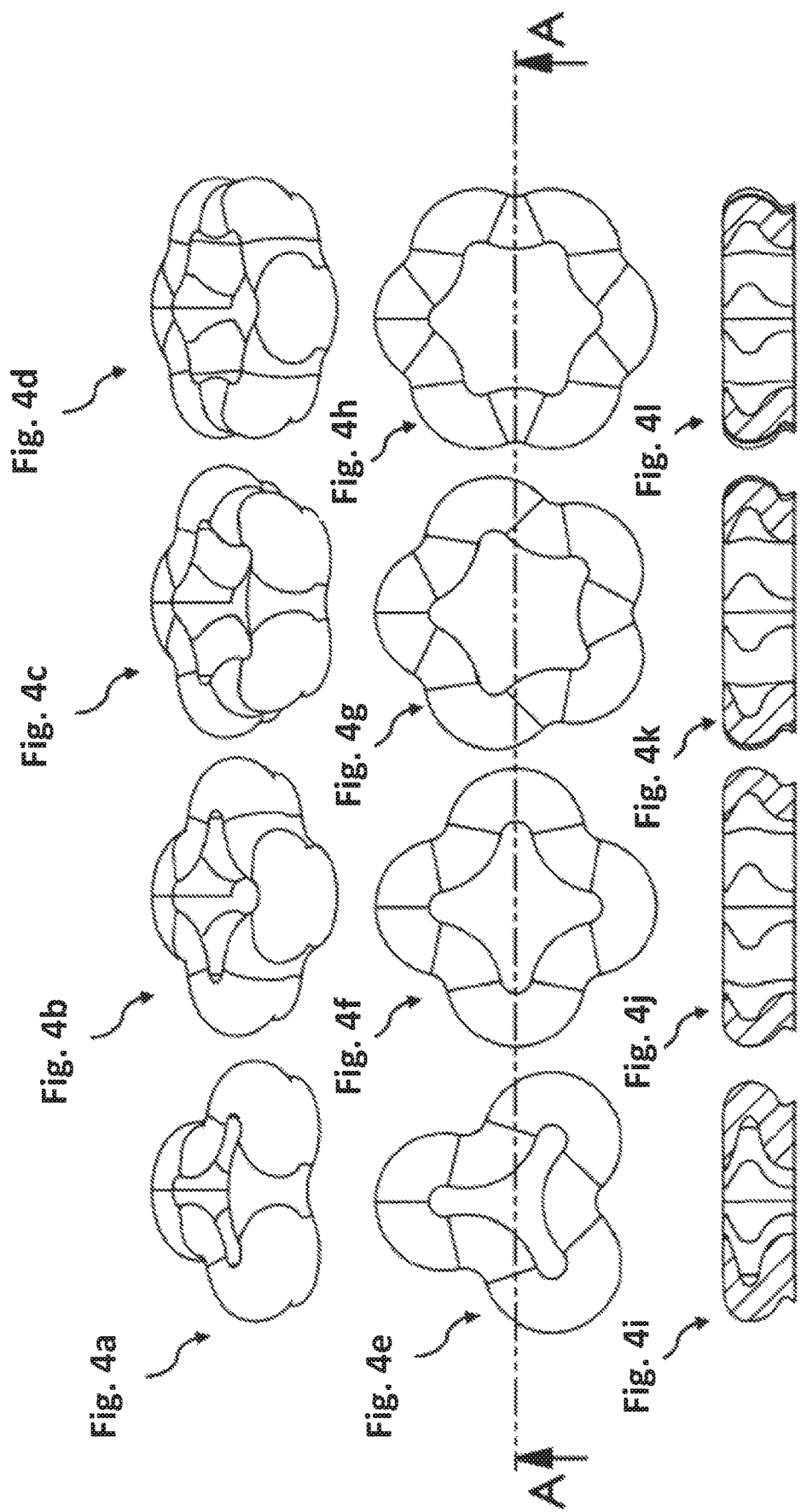

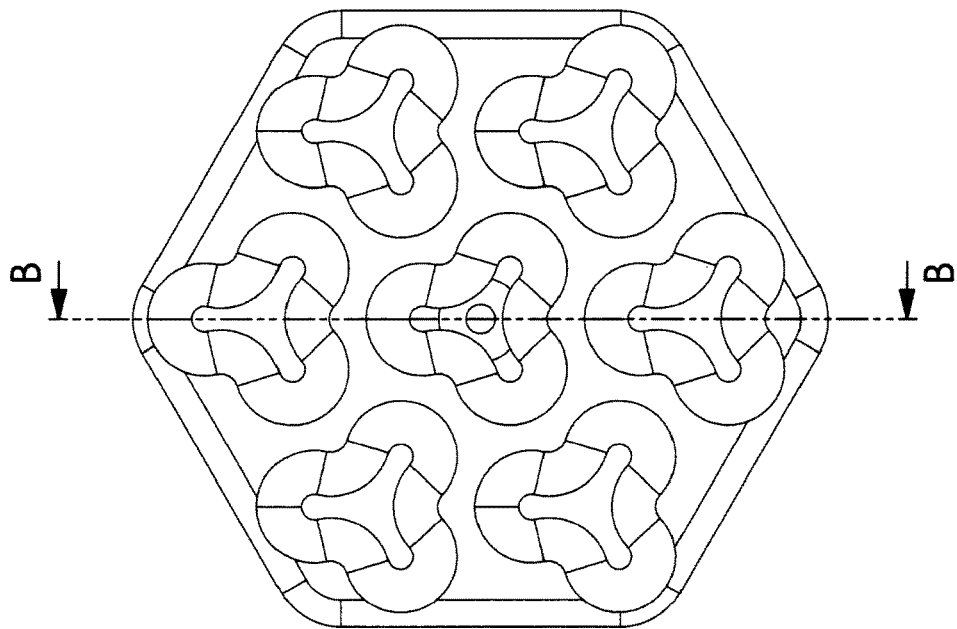
Fig. 5c
Fig. 5b
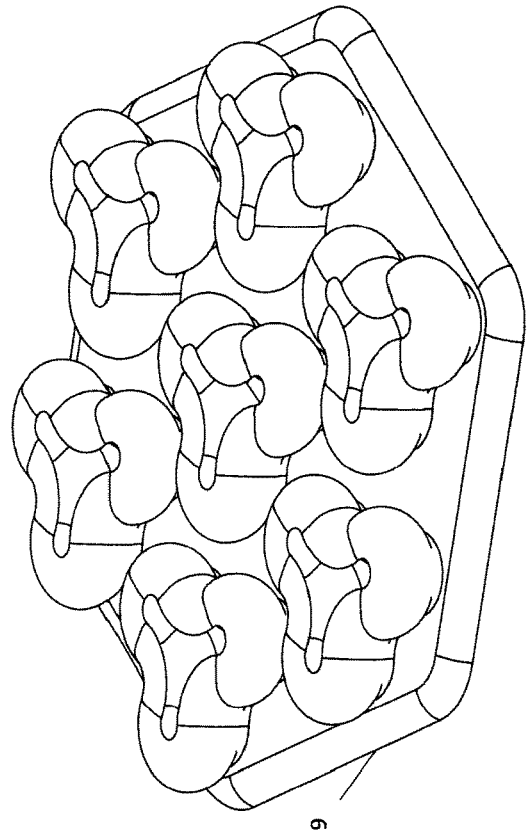
Fig. 5a

| | Velocity (m/s) | Reference | | Advanced Liner | | Mean Peak Linear Acc Reduction (%) | Mean Peak Rotational Acc Reduction (%) |
|---|---|---|---|---|---|---|---|
| | | Mean Linear Acceleration (g) | Mean Rotational Acceleration (Rad/s^2) | Mean Linear Acceleration (g) | Mean Rotational Acceleration (Rad/s^2) | | |
| Motorcycle helmet - composite shell - EPS liner (dual density) | 4.3 | 37.9 | 2647.6 | 32.7 | 2250.8 | 14% | 15% |
| Ski / snow helmet - injection moulded ABS shell - EPS liner | 4.3 | 50.8 | 5713.3 | 38.9 | 4424.0 | 23% | 23% |

Fig. 6

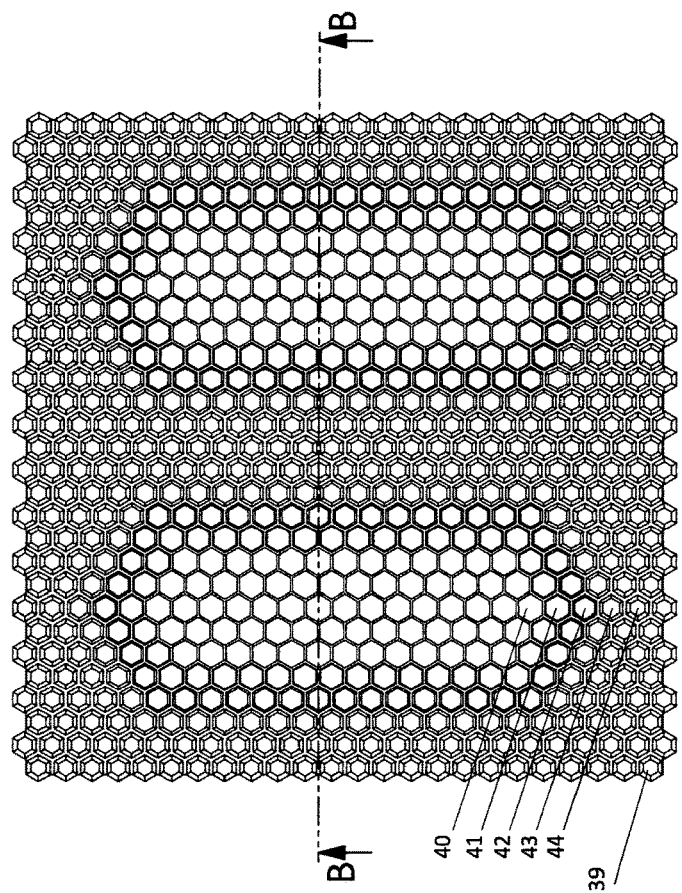
Fig. 15b
Fig. 15c
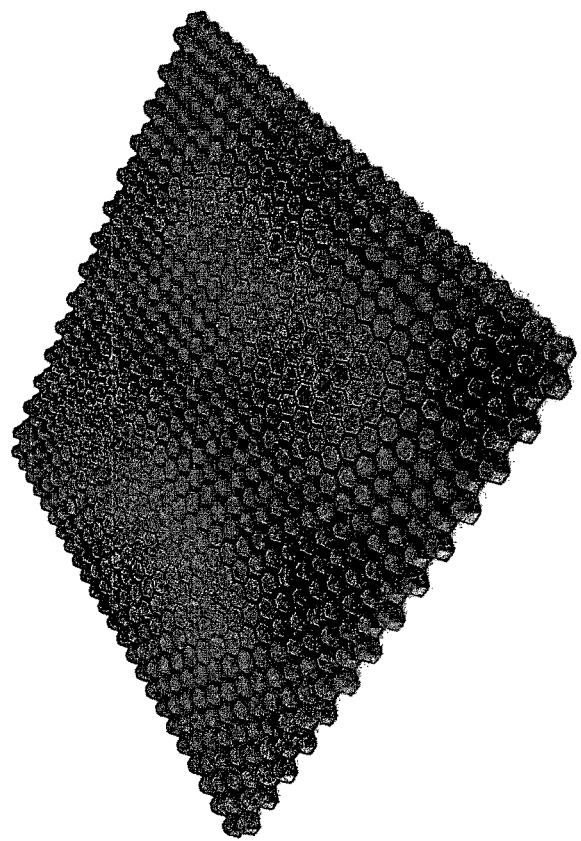
Fig. 15a

ENERGY ABSORBING SYSTEMS

CROSS-REFERENCE TO RELATED APPLICATIONS

This Application is a continuation of PCT International Application No. PCT/GB2018/052425, filed on Aug. 28, 2018, which claims priority to GB Application No. 1713840.5, filed on Aug. 29, 2017, the entire contents of each of which are incorporated herein by reference.

INTRODUCTION

The present disclosure relates to energy absorbing systems. In particular, but not exclusively, the present disclosure relates to flexible energy absorbing systems comprising a plurality of cells.

During any accident, impacts to the head can cause linear and rotational acceleration of the brain and research shows that a combination of these can cause traumatic brain injury, which can lead to death as described in Zhang, Liying, King H. Yang, and Albert I. King. "A proposed injury threshold for mild traumatic brain injury." Journal of biomechanical engineering 126.2 (2004): 226-236.

Linear acceleration can be reduced by use of an energy absorbing system such as expanded polystyrene (EPS) in a helmet to absorb energy as it is crushed during an impact. Many known helmet designs make use of this material, combined with a hard outer shell to spread the load of an impact and a soft comfort liner which sits against the head to improve fit and comfort. A key element in energy absorption is the EPS layer and apart from alterations to the density of EPS and use of other energy absorbing foams, sports helmet technology has not advanced in the last 20 years. In addition, the trend for smaller and slimmer helmets has only increased the density and stiffness of these foams in order to pass the test standard at high speeds, leading to helmets which do not protect against sub-concussive or slow speed impacts. The build-up of impacts over time has been shown to lead to mild traumatic brain injury (MTBI) with long-term effects, which is a key concern at present in contact sports and a growing concern in relation to head protection systems.

In addition to linear acceleration, there is a component of rotational acceleration, which is imparted to the head during an impact. Impacts to the head often occur at an angle and therefore the rotational component of acceleration can be significant. The recent focus of research into rotational acceleration of the brain is capturing the attention of helmet manufacturers who are now endeavoring to improve protection against it. Current helmets have not been optimized to reduce rotational acceleration.

There are a number of previously filed patent applications, based around circular or turned (axisymmetric) geometry in an energy absorbing system within a helmet. That is, any element that has a round feature, or can be extruded from a tube, or swept around a single axis.

6D™ helmets use long elements that are essentially turned around the long axis to hold two layers of EPS apart in a helmet, see for example International patent application no. WO 2012109381 A1. LEATT™ 360 turbines are circular turbine or disks that are essentially round elements to improve the performance of an EPS helmet, see for example International patent application no. WO 2015177747 A1. CUBE™ bikes filed a German design filling on some essentially round elements, see DE 20 2015 101 194 U1, which details multiple elements going into a helmet. CCM™ have placed round, or circular elements into their Ice Hockey helmet called RED. These are round disks of EPS, enclosed in a round cup or disk of red TPE, multiple of these elements are placed between the shell and the liner. The common theme with these helmets is that the elements are all round, or disks. They can all be made on a computer-aided design (CAD) program with the rotate around axis command (with some additional detail added in some cases), or most of the features, built on a lathe if the materials are suitable.

Most known limb protectors today are based around a hard shell and then a soft foam energy absorber, or a foamed component. They are typically not very flexible, often not less than 10 mm thick to meet the CE norm EN1621 and only have 5% of cross section of holes or so in them for breathability. They are also made from materials which are typically homogeneous, or more specifically bulk materials with little control on density. Some of the foamed parts are skinned. The performance, can be tuned, with global material density, and more often thickness. Typical Polyurethane (PU) parts would have a core thickness higher than that around the edge, and very little internal geometric control or detail.

A typical 'winged part' is available in the market place. These have been made in a simple flat tool and are molded onto textile. They have been sold to BLISS™, and directly stitched into garments. An internet search for BLISS™ elbow or knee protection will show the designs of a flat protector that is subsequently wrapped into shape when it is worn.

These flat parts, are then wrapped around the limb and held in place, by the holster or garment. The geometry in this case is internal and re-entrant, and is covered for example by International patent application WO2010076257 and, once wrapped, the internal axis of the geometry always acts in the normal direction to the surface that it protects. The cells are distributed in an ordered geometric grid of constant dimensions giving a global density of pins which does not change. Impact performance is changed with the thickness of the parts, these parts are 6 mm thick in the center and reduce down to 4 mm on the sides. They are injection molded directly onto textile. The textile adds to the performance of the part and also allows for separate sections to be molded in the same tool and stitched into the same garment. This is already known in the art, and is described for example in United States Patent Application No. 2016/0245358 A1.

BRIEF SUMMARY

According to a first aspect of the present disclosure, there is provided a flexible energy absorbing system comprising a first plurality of cells comprising a first re-entrant geometry and a second plurality of cells comprising a second, different geometry, wherein the first plurality of cells and the second plurality of cells comprise an elastomeric material.

Other aspects of the present disclosure comprise body armor, helmets or protective garments comprising the system of the first aspect of the present disclosure.

According to a second aspect of the present disclosure, there is provided a method of manufacturing a flexible energy absorbing system comprising an elastomeric material, the method comprising forming a first plurality of cells comprising a first re-entrant geometry, and forming a second plurality of cells comprising a second, different geometry.

According to a third aspect of the present disclosure, there is provided a flexible energy absorbing system comprising a plurality of cells, the plurality of cells comprising a strain rate sensitive material, wherein a first portion of the plurality of cells are comprised within a first area of the system at a first packing density, and wherein a second portion of the plurality of cells are comprised within a second zone of the system at a second packing density, the second packing density being less than the first packing density.

According to a fourth aspect of the present disclosure, there is provided a flexible energy absorbing system comprising at least one cell comprising anisotropic geometries which are different in at least three directions.

According to a fifth aspect of the present disclosure, there is provided a helmet comprising a flexible energy absorbing system comprising at least one cell comprising anisotropic geometries which are different in at least three directions.

Embodiments of the present disclosure comprise a protective element which is placed inside a helmet to reduce the risk of brain injury and improve the survivability of accidents and impacts. Multiple elements form a helmet liner. The liner reduces both linear and rotational brain acceleration, whilst improving breathability and temperature control inside the helmet, offering an improvement in protection and comfort.

The desired level of protection against translational and rotational acceleration of the brain is important and varies for different planes and axes of the head. The helmet liner offers a different level of protection in different directions as opposed to a global level of protection which does not vary. The liner also offers improved performance at low energy or sub-concussive level impact.

In addition to use for head protection, embodiments of the present disclosure can be used to protect other areas of the body.

Other embodiments of the present disclosure use geometry and molding techniques to give different energy absorbing properties in different directions. This is also particularly useful in Personal Protective Equipment (PPE), and also limb protection and body armor.

Further embodiments of the present disclosure relate to how the performance of such a molded part can be changed by varying the internal or core geometry for normalized and oblique impact using anisotropic geometries, different in three directions, as well as different global area density.

The technology of embodiments of the present disclosure has been tested on motorcycle, bicycle and other sports helmets and is applicable to many more, even soft helmets for soccer and rugby.

Embodiments aim to reduce rotational acceleration and tune performance in each axis (axial, sagittal and coronal) for normal and oblique impacts.

BRIEF DESCRIPTION OF THE DRAWINGS

FIGS. 4a-4l depict further example energy absorbing elements.

FIGS. 5a-5c depict example arrangements of energy absorbing elements.

FIG. 6 depicts example test results with respect to energy absorbing elements.

FIG. 7 depicts example traces of the rotational acceleration for a first type of reference helmet and a helmet fitted with the energy absorbing element of FIG. 5a.

FIG. 8 depicts further example traces of the rotational acceleration for a second type of reference helmet and a helmet fitted with the energy absorbing element of FIG. 5a.

FIGS. 15a-15c depict example embodiments of energy absorbing components.

DETAILED DESCRIPTION

Protecting the Head

The present disclosure develops further geometry which is not round, or turned, or similar across two of the three axes, like a turned part. Embodiments comprises a part that has truly anisotropic behavior (i.e. different response and behavior to mechanical deformation in all 3 directions). As the brain and skull are not symmetrical, there is merit in having elements that can be oriented to give different performance in three principle directions and combination vectors of these directions. Normal would be in the Z direction, or compression of the element normal to its top surface (this is like a normalized linear impact). In direction X, aligned with the sagittal plane of the helmet, the performance could be tuned, and would be different to that of direction Y, which would be aligned with the coronal plain. The performance of the element also differs in directions between these principal directions.

Figure 1C:
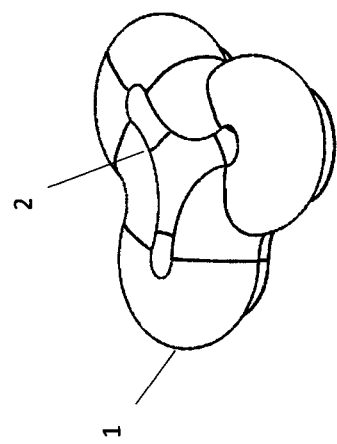
FIGS. 1a-1c depict example energy absorbing elements.
Figure 1B:
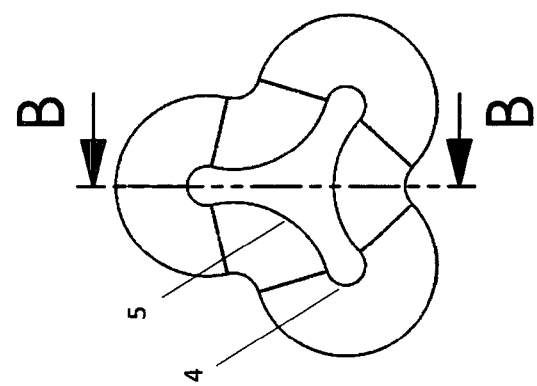
Figure 1A:
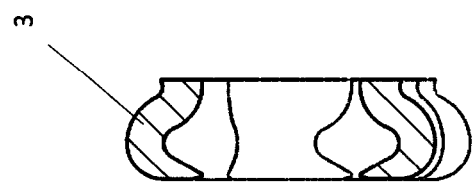

The anisotropic energy absorbing element shown in FIG. 1a is an example of one embodiment of the present disclosure. FIG. 1a shows an isometric view of an energy absorbing element which is truly anisotropic. FIG. 1b shows the top view of the element and FIG. 1c shows a cross-section view of section B-B shown in FIG. 1b. In embodiments of FIGS. 1a-c, the element 1 has a re-entrant geometry which extends, by way of example, in a direction normal to the top surface of the element. In other embodiments, the re-entrant geometry is in any other direction. FIG. 1c shows the cross section 3 of the element which can be swept along a path. In this embodiment, the path is not circular. In other embodiments, the path is circular and the wall thickness varies around the path in the radial direction to provide anisotropic behavior of the element. In the embodiment shown in FIG. 1b, the element is formed of an outer wall which follows a path, which can be broken or unbroken, and which is defined by a number of points. The path is smoothed so that corners at the points have a convex radius 4 and lines between the points have a concave radius 5. This gives the element a very different feeling and softness when compared to a simpler circular part with constant wall thickness.

The embodiment shown in FIG. 1a also has more surface area on the top surface 2 of the part than if the walls were to extend vertically towards the top of the element without bending or curving inwards. If a number of these elements were placed on the inside of a helmet then this surface area on the top of the element, would then be next to the head. To improve comfort, it is important to maximize this surface area as much as possible in order to reduce pressure points. In the embodiment shown in FIG. 1a, the area on the top of the element 2 is made large, while still keeping the element soft, and allowing for 6 or 4 points of inflection where the element can buckle (4, 5). These elements are more unstable in shear deformation (with reference to the plane of the top surface being a shear plane), than a round, turned or axisymmetric element, as they don't have a stable outer wheel of constant thickness in the radial direction The swept geometry here would form a re-entrant shape, as mentioned for example in International patent application no. WO2010/076257, but the concave and complex triangle as described and shown in FIG. 1a is what gives it a unique shape. The element is not just extruded in outside shape, but needs the convex and concave shapes to form the points of inflection, noted by (4, 5) in the plan view.

Figure 2C:
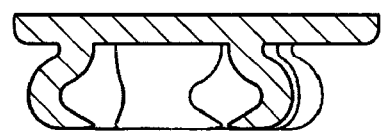
FIGS. 2a-2c depict further example energy absorbing elements.
Figure 2B:
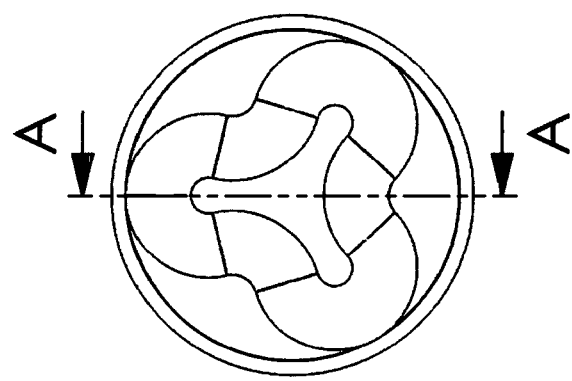
Figure 2A:
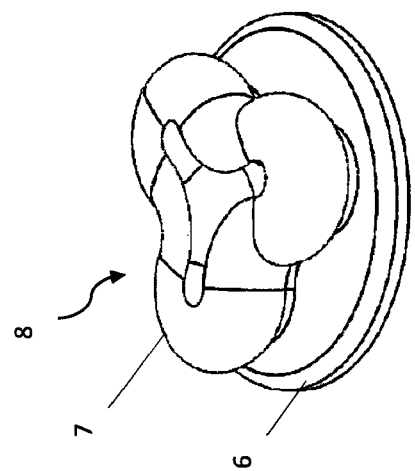
Figure 3A:
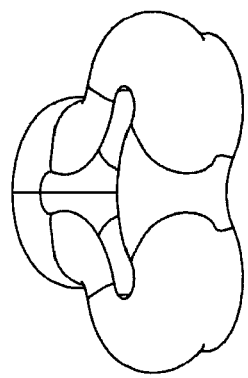
FIGS. 3a-3d depict further example energy absorbing elements.
Figure 3B:
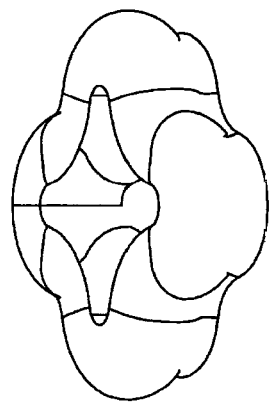
Figure 3C:
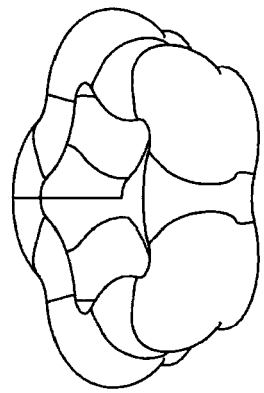
Figure 3D:
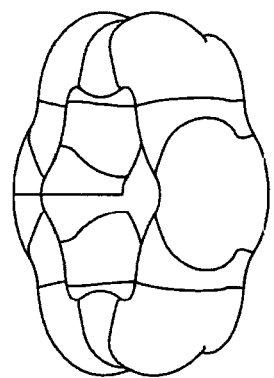

FIGS. 2a-2c show another embodiment of the present disclosure, where the element 7 is connected to a base 6. This base can be directly connected to the element by a number of means including but not exclusively a mechanical or adhesive solution or any other means. Alternatively, the element can be manufactured in such a way that the base 6 and element 7 form a single piece 8. Manufacturing the base 6 and the element 7 as a single part 8 reduces the number of steps required during manufacture. The base 6 and element 7 can have single or multiple connections between them. These connections could allow for additional movement and sliding between the element and the base.

The swept path described and shown in these embodiments is based on a shape with multiple points. The swept path can be based on a triangular (3), square (4), pentagonal (5) or hexagonal (6) or more pointed shape. The embodiment shown in FIGS. 1a-1c is an example of a swept path based on a three-pointed shape. In other embodiments, the path can be formed by any other geometric shape, or between irregular points or any other path not described by a geometric shape.

Examples of other possible embodiments of the present disclosure are shown in FIGS. 3a, 3b, 3c and 3d which are based on a swept path of 3, 4, 5, and 6 points, respectively. FIGS. 4e, 4f, 4g and 4h show the top view of the embodiments in FIGS. 4a, 4b, 4c, and 4d, respectively, and FIGS. 4j, 4k and 4l show the cross-section views of the embodiments in FIGS. 4a, 4b, 4c, and 4d, respectively.

Figure 7:
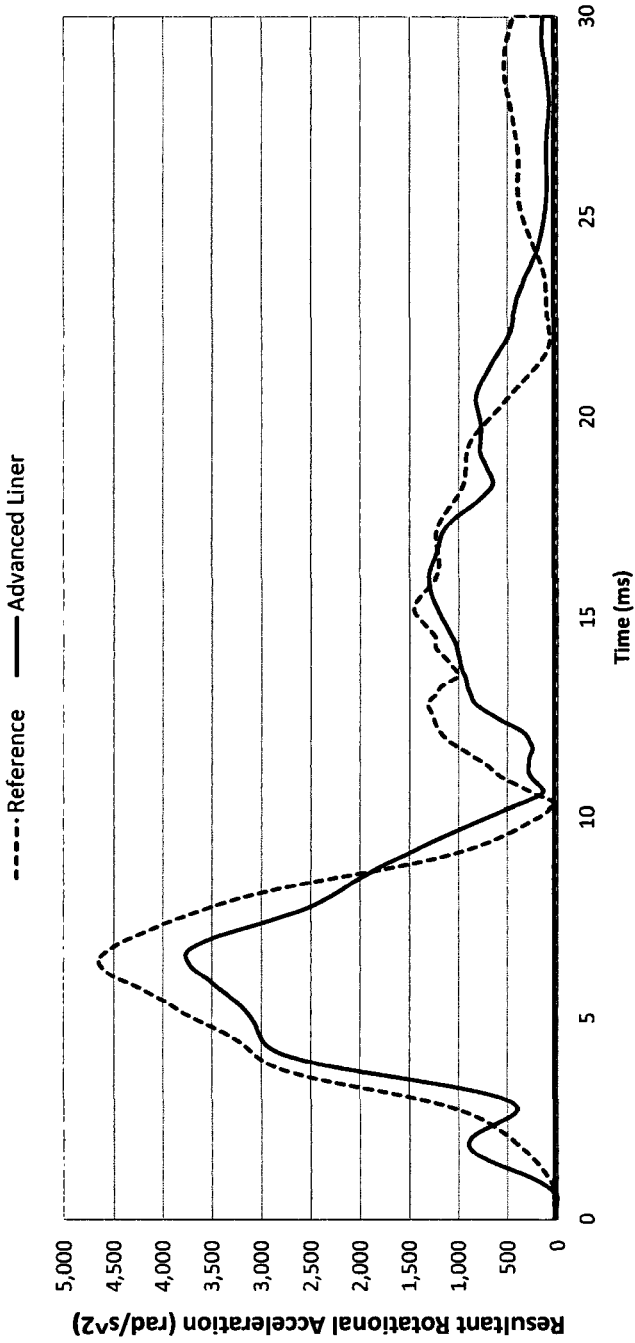
Figure 8:
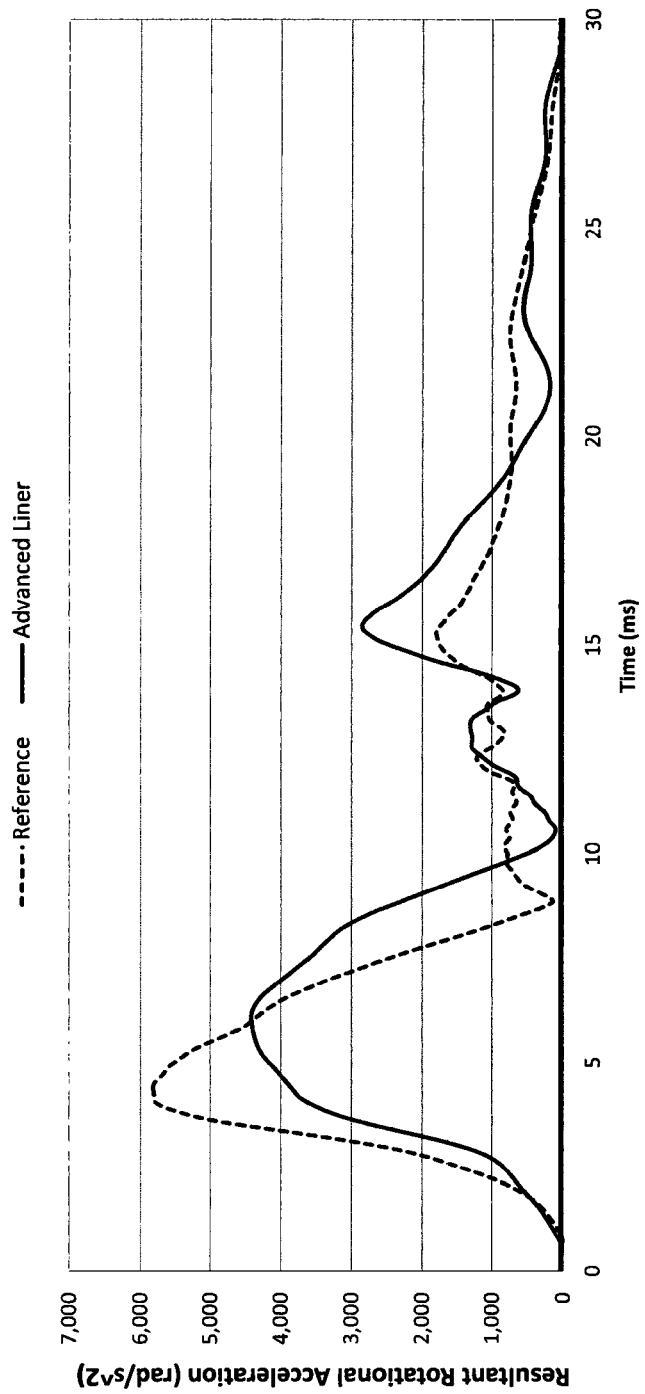

These elements can be used individually, or in plurality. FIGS. 5a-5c show an embodiment of the present disclosure where seven elements are arranged in an array. The embodiment shows the elements connected to a base. A number of individual elements shown in the embodiment in FIGS. 1a-1c or arrays of elements shown in the embodiment of FIGS. 5a-5c can be added to a helmet. Elements shown in FIGS. 5a-5c inserted in motorcycle and ski/snow helmets have been shown to reduce the peak linear and rotational accelerations when impacted by up to 23%. FIG. 6 shows the results of the tests and FIG. 7 and FIG. 8 show traces of the rotational acceleration for the reference helmets and the helmets fitted with the embodiment of FIGS. 5a-5c (the 'advanced liner').

The elements described in the present disclosure can be attached to a tensile layer (for example a textile) or attached directly into a helmet. Elements or arrays of elements can be directly molded onto or attached to a tensile layer (for example by adhesive) which can then be stitched into a helmet liner or attached into the helmet. Elements or arrays of elements with or without a tensile layer can be attached directly into the helmet using an adhesive (for example glue or pressure sensitive adhesive tape).

The elements of the present disclosure could be used in the middle or central part of any helmet, either in direct contact with the head, in between layers of energy absorbing liners or in between a hard, outer shell and an energy absorbing layer.

The elements of the present disclosure can be made from a flexible material, preferably high damping. In some embodiments, the material is strain rate sensitive. A strain rate sensitive material can be defined as a material whose properties change with increasing strain rate. Some thermoplastic elastomers exhibit good characteristics for this use and can be injection molded.

Protecting the Body

When protecting the body from impacts, in a similar method described for helmets, the impacts do not always come from the normal direction. It is more than likely that there will be an oblique element, or glancing blow. When falling off a bike for example and landing on a limb, in some cases an elbow, there is a normal component to the impact (vertical direction towards the ground or impact surface), and also a perpendicular component in the horizontal direction from the original velocity and direction of travel of the wearer. These combine to give an impact vector which is neither parallel nor perpendicular to the impact surface in most impact events. Thus, an improved protective garment or component could have internal geometries that would improve impact performance in this horizontal direction as well as the normal direction.

Additionally, the level of protection would be optimized for different areas of the region of the body being protected by the garment or component to maximize protection and flexibility. This level of protection can be optimized by changing the geometry of the cells and the destiny of the cell packing rather than by changing the component thickness. Thus, the impact performance of the armor part is different in different directions and regions. We define these directions as normal (Z, component through-thickness direction), forwards direction (X) would be going down the limb or joint towards the distal end (proximal-distal direction), and then Y which is side to side across the joint (posterior-anterior direction).

In the present disclosure, we are optimizing impact performance for normalized impact in the Z direction, and also adding or improving impact performance in an oblique impact (an impact in the direction of a vector which combines 2 or more of the principle directions) through the use of a cell geometry. Impact performance can therefore be optimized for normal or oblique impacts for any direction or combination of directions. The direction of the cells changes across the surface of the component (with reference to a surface normal on the component) to give different performance in different directions, to improve the oblique performance, and allow the local geometry to deform to dissipate and deflect the energy of a glancing blow. This is similar to the truly anisotropic parts described in the helmet embodiments described above, they too perform differently in the X, Y and Z directions and their performance can be optimized.

Figure 9B:
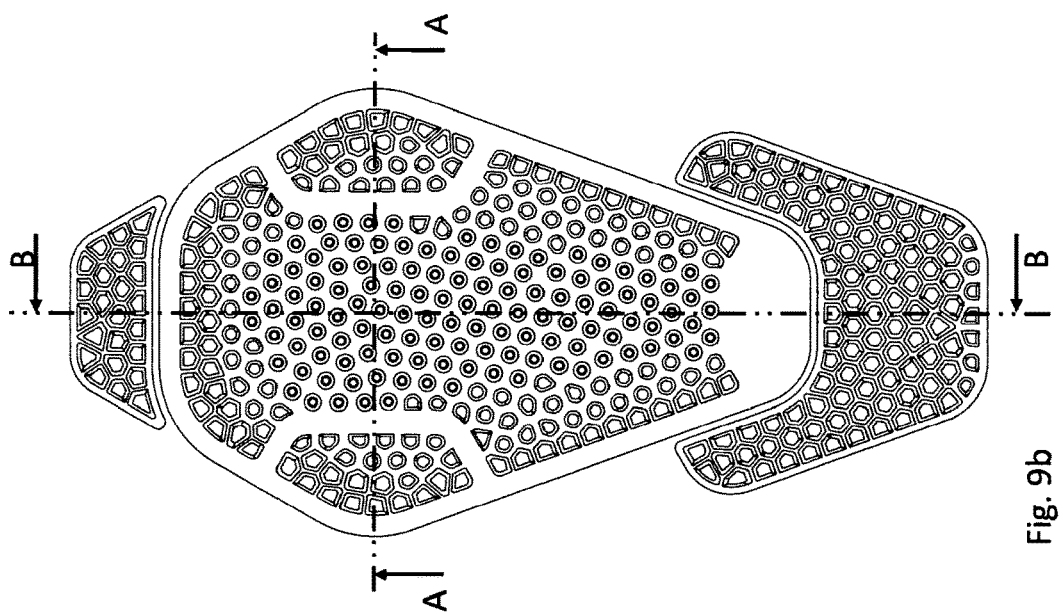
FIGS. 9a-9b depict example energy absorbing components.
Figure 9A:
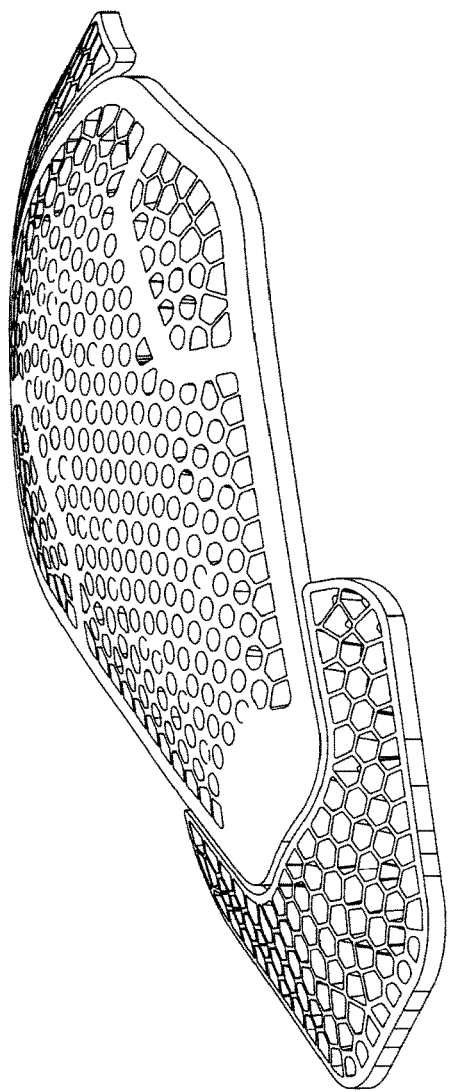
Figure 10:
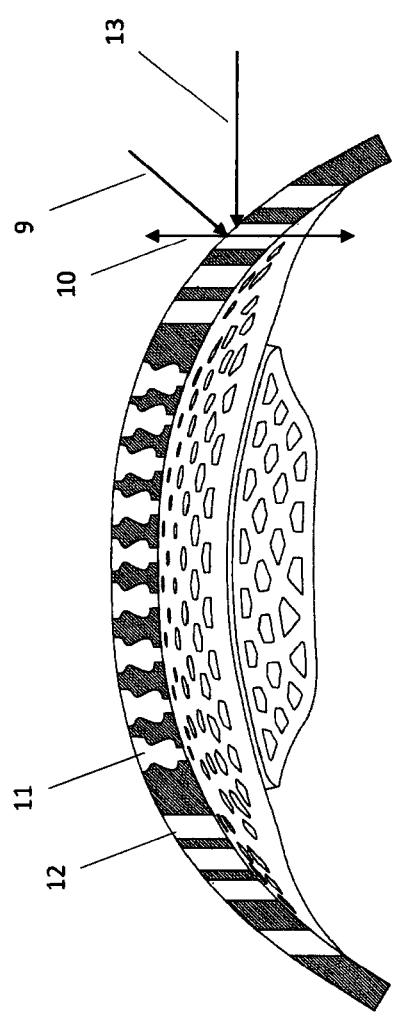
FIG. 10 depicts a cross sectional view of the example energy absorbing component of FIG. 9b.

In one embodiment of the present disclosure is shown in FIG. 9a. The top view of the component is shown in FIG. 9b. FIG. 10 shows the section marked A-A in FIG. 9b. In the embodiment shown in FIG. 10, these cells have a complex internal re-entrant geometry 11 in some areas. The cell walls are straight 12 in other areas. The component has cells which are arranged so that their long axis (i.e. the primary direction of their walls) is not aligned to a surface normal of the component. Instead, they are aligned in the direction that the injection mold tooling opens, for example, which for some or all of the component is not normal to the global component surface. When the component is impacted in a surface normal direction 9, some cells are impacted in a direction which is not aligned with their axis 10. This gives a different performance to cells whose axis lies at a different angle to the surface normal. This difference in performance can be optimized by changing the angle of the cell axis for different areas of the protective component. In addition, if the component is impacted in an oblique way, for example 13, the impact performance is different according to the cell direction. For a given cell with a given cell direction, the impact performance of the component is different if the impact is oblique in the X direction compared to one which is oblique in the Y direction (and directions in between these).

FIG. 10, shows the cross section marked A-A in FIG. 9b of an embodiment of the present disclosure. In this embodiment, and others, cells which have straight walls 12, if not aligned with a surface normal of the component 9 (i.e. the normal impact direction), form a re-entrant or undercut geometry in the direction of impact. This gives a different impact performance compared with a vertical walled cell which is aligned with a surface normal. The angled cell has a pre-disposition to buckle and collapse or fold as it is impacted which dissipates energy. If this cell is impacted in an oblique angle, for example 13, then the impact performance will again be different. The geometry or the direction of the cells can be optimized to improve impact performance in this, and other, directions. Thus, the geometry is giving a change in performance that is optimized from the mold line 10.

Figure 11:
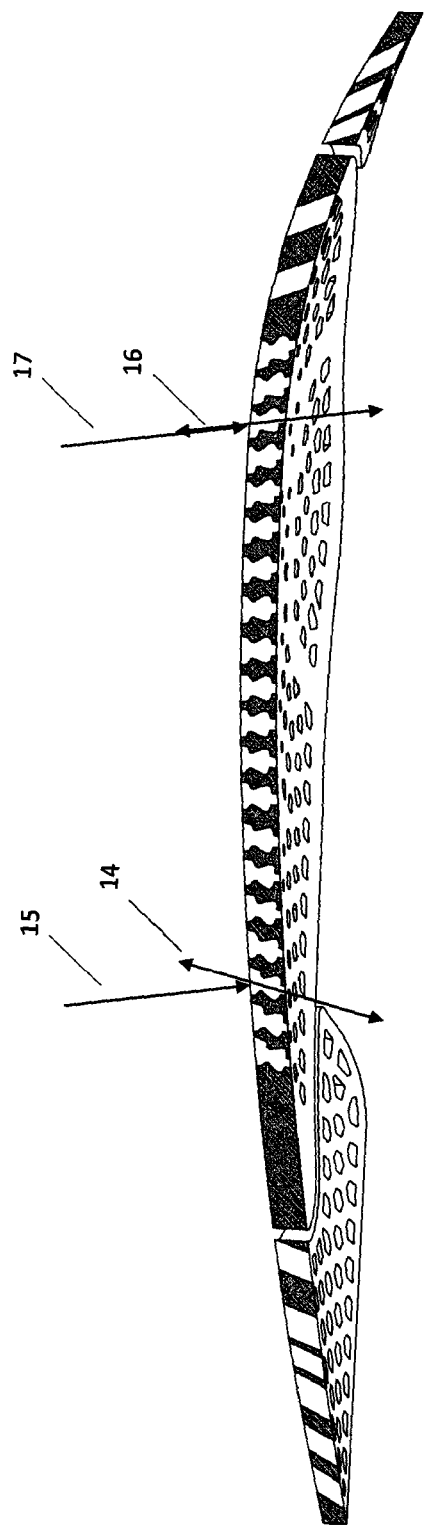
FIG. 11 depicts another cross sectional view of the example energy absorbing component of FIG. 9b.

FIG. 11 shows the section marked B-B in FIG. 9b, the cells are orientated in different directions 14 and 16. This is another example of where a different impact performance will be seen if the component is impacted, with the same oblique angle 15 and 17, in areas where cells have a different orientation.

Figure 12:
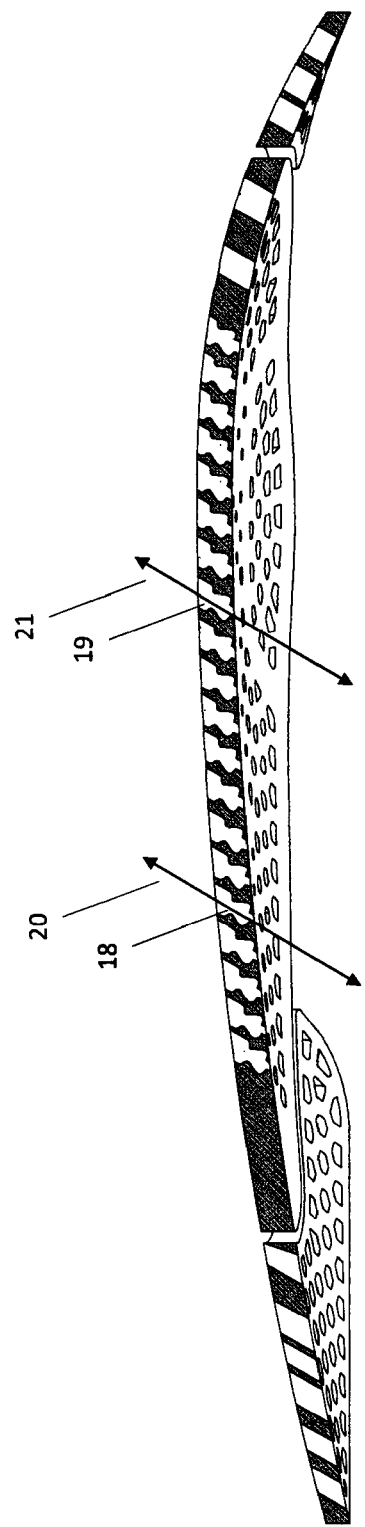
FIG. 12 depicts another cross sectional view of an example energy absorbing component.

Another embodiment shown in FIG. 12, the cells for example 18 and 19, have the same orientation shown by the mold line direction 20 and 21.

Figure 13:
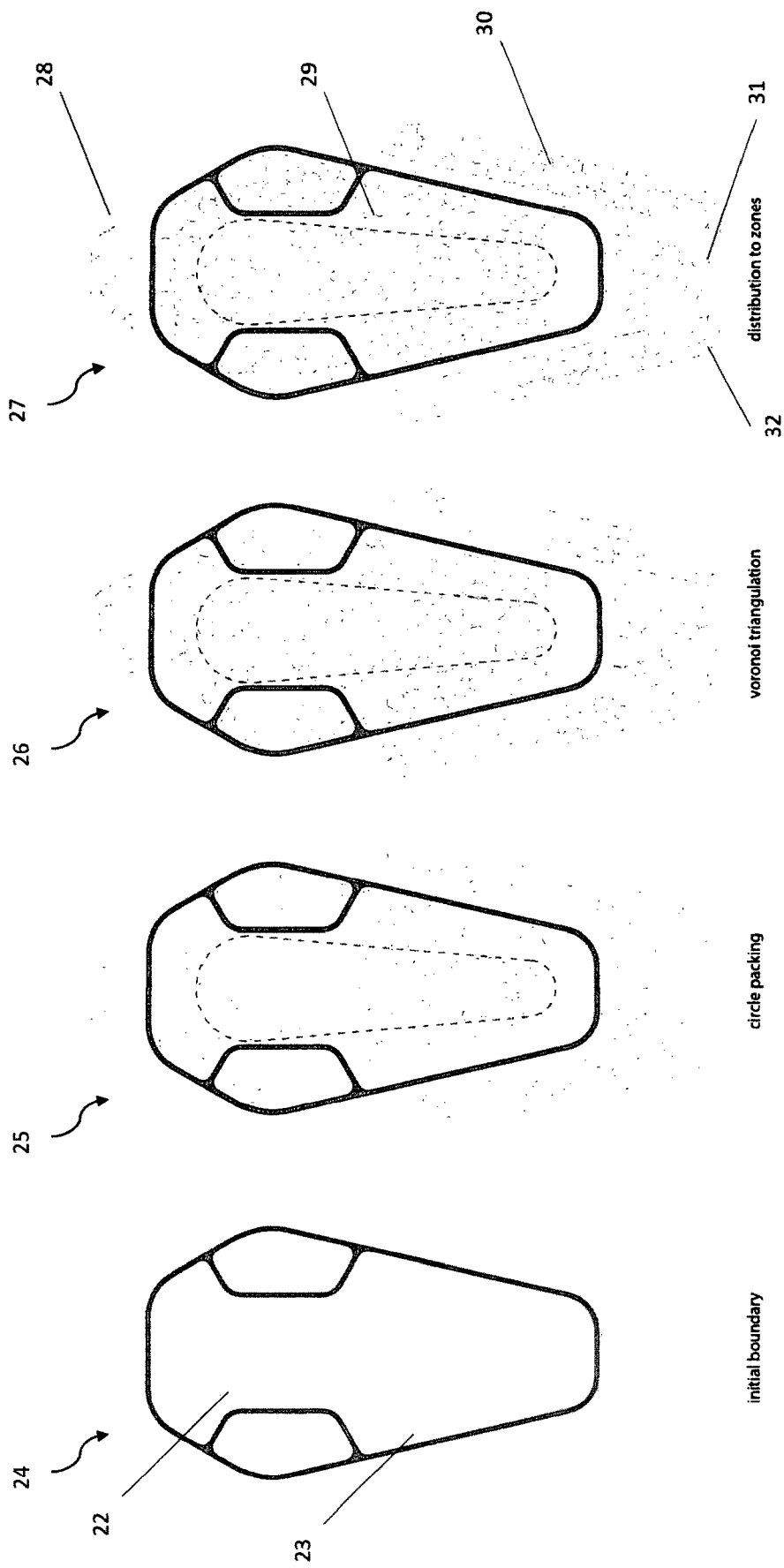
FIG. 13 depicts an example process for designing an energy absorbing component.
Figure 14:
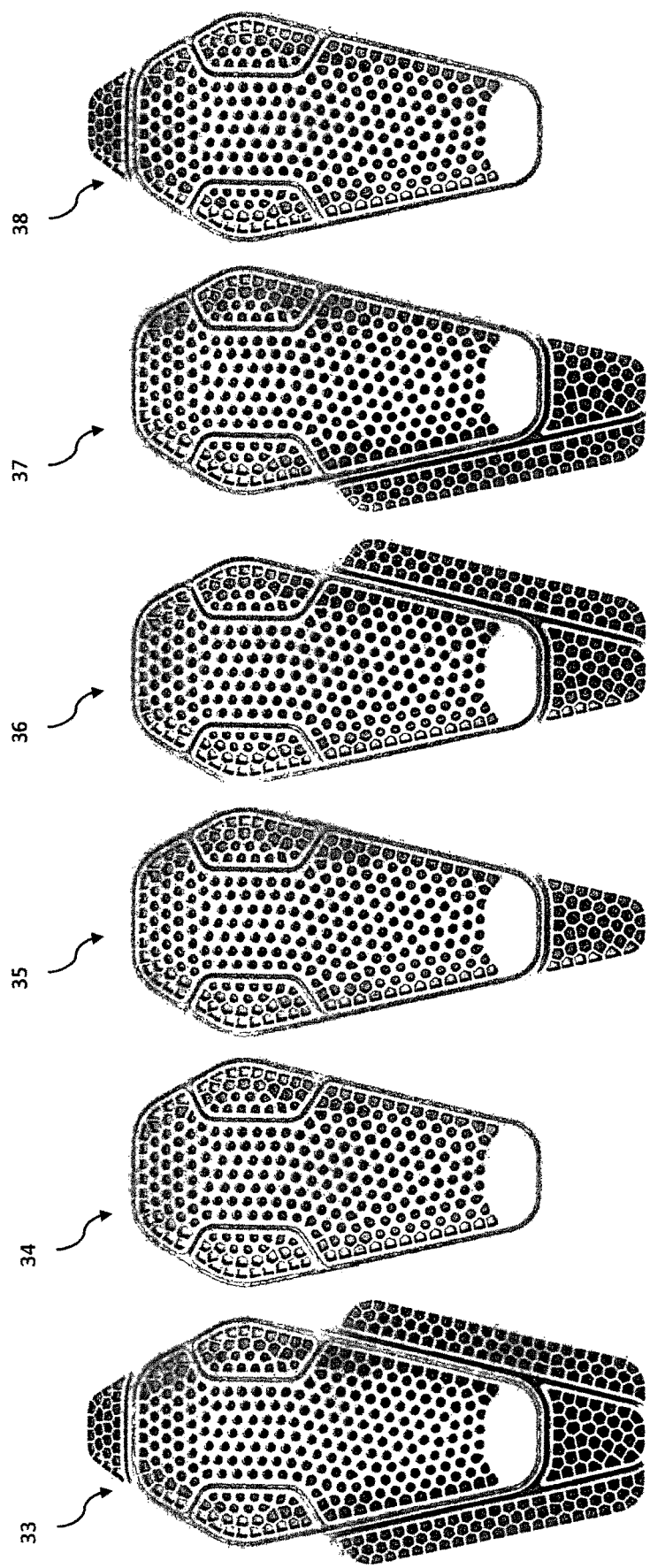
FIG. 14 depicts example embodiments of manufactured energy absorbing components.

Other embodiments of the present disclosure employ varied cell packing densities or cell geometries to alter impact performance across the component. The global component through-thickness (Z direction) remains constant but the spacing between the cells, the cell geometry or the geometry of the areas between the cells changes. This leads to an apparent change in density in local areas of the component which can be optimized for impact performance. In one embodiment, an approach has been to change the geometry between two different geometries of cells, from a core area which offers the maximum level of protection and the side area which offers less protection. An overview of a 3D version of this embodiment is shown in FIG. 9a. FIG. 13 shows the process in designing the component, starting with a core area 22 of the global shape 24 identified for a higher level of impact performance. The central core area 22 of this component is designed to give a different level of protection to that of the sides 23. Circle packing is carried out 25 to identify the locations of the cells. Using the same locations identified in 25, another cell geometry is packed into the global component shape 26. These are then combined in 27 and the transition between the two geometries is smoothed. In this embodiment, these changes in impact performance levels are carried out with geometry alone where one type of cell geometry is used in the core area and gradually fades towards another type of cell geometry towards the edge of the component. In addition to cell geometry change, the density of the cell packing between these two areas, i.e. how closely the cells are positioned together, also changes in other embodiments. In addition, in the embodiment 27 shown in FIG. 13, areas of the injection mold tool 28, 29, 30, 31, 32 can be turned off in production independently in order to create a number of embodiments 33, 34, 35, 36, 37 and 38 shown in FIG. 14.

The impact performance of the core area is high, but this can be mapped to body specific areas in order to offer the maximum protection in the most vulnerable areas anatomically. In this embodiment, the cell packing is varied in two densities, but it is mapped fading between two or more densities, over different body areas, in other embodiments. In a knee protector for example, more protection is given to the patella (which lies under the core area of the protector) and the bony protrusions at the ends of the tibia and femur. Other areas of the protective component have cells packed in a different density and/or a different geometry. The cell packing density or geometry in regions lying between these areas of high and lower protection fades between the two. This way the level of protection is tunable with geometry and not thickness and material, although these can also be changed.

An embodiment of the present disclosure is shown in FIG. 15b. This shows how the elements or cells in the center of the component have a different geometry to those at the edge. Instead of being internal cells, FIG. 15a shows elements, for example 39, which have an external geometry. FIG. 15c shows the cross section marked B-B in FIG. 15b. Internal cells are also present inside each element in another embodiment. There are five or more different levels of density (driven by element or cell geometry) in this embodiment moving from the densest area in the center 40 to the least dense area at the edge 44, with reducing elements sizes in between 41, 42, 43 forming areas of reduced density. The component thickness remains the same. The embodiment shown in FIG. 15a has been tested behind a ballistic pack, in this case 27 layers of gold flex aramid, and has shown to give different levels of back face signature (trauma) depending on the density of the component, not the thickness.

There are a number of other body armor uses for the present disclosure. For a back protector, by way of example, there could be a different geometry or cell density or indeed thickness in the core spine area compared to that of an area further away from the spine.

Keeping a similar thickness, but changing the density of the component by use of geometry, would also have merit in zones. Different densities in different zones also gives different level of protection in different areas of the body.

These parts are made from a flexible material, for example high damping. In some embodiments, the material is strain rate sensitive. A strain rate sensitive material can be defined as a material whose properties change with increasing strain rate. Some thermoplastic elastomers exhibit good characteristics for this use and can be injection molded.

What is claimed is:
1. A flexible energy absorbing system, comprising:
   a first plurality of cells comprising a first re-entrant geometry which extends directly from a top surface of the system to a bottom surface of the system; and
   a second plurality of cells comprising a second geometry, different from the first re-entrant geometry which extends directly from the top surface of the system to the bottom surface of the system,
   wherein the first plurality of cells and the second plurality of cells comprise an elastomeric material, wherein one or both of the first re-entrant geometry and the second geometry comprise an internal cell wall re-entrant geometry which extends directly from the top surface of the system to the bottom surface of the system, wherein cells in the first plurality are orientated along a first axis and cells in the second plurality are orientated along a second, different axis, and wherein one or both of the first axis and the second axis are not normal to the top surface of the system and the bottom surface of the system.

2. The system according to claim 1, wherein one or both of the first axis or the second axis are aligned with a direction in which an injection molding tool used to manufacture the system opens.

3. The system according to claim 1, wherein at least one cell of the first plurality of cells comprises an anisotropic geometry along a different axis than the first axis.

4. The system according to claim 1, wherein at least one cell of the second plurality of cells comprises an anisotropic geometry along a different axis than the second axis.

5. The system according to claim 1, wherein cells of the first plurality of cells are located in a first area of the system and cells of the second plurality of cells are located in a second area of the system, different from the first area of the system.

6. The system according to claim 5, wherein cells in the first area are packed at a different density than cells in the second area.

7. The system according to claim 5, wherein cells in the first area are packed at a higher density than cells in the second area.

8. The system according to claim 5, wherein the first area comprises a core area and the second area comprises an edge area surrounding the core area.

9. The system according to claim 5, wherein the system comprises one or more edges, and cells in the second area are located closer to the one or more edges of the system than cells in the first area.

10. The system according to claim 5, wherein a geometry of the first plurality of cells and a geometry of the second plurality of cells gradually changes from the first re-entrant geometry in the first area to the second geometry in the second area.

11. The system according to claim 5, wherein a packing density of the first plurality of cells and a packing density of the second plurality of cells gradually changes from a relatively higher packing density in the first area to a relatively lower packing density in the second area.

12. The system according to claim 5, wherein the system comprises body armor.

13. The system of claim 12, wherein the first area is associated with a first body area to be protected and the second area is associated with a second body area to be protected, different from the first body area to be protected.

14. The system according to claim 13, wherein the first body area is a relatively more vulnerable anatomical body area than the second body area.

15. The system according to claim 13, wherein:
the body armor comprises a knee protector, and
the first body area comprises one or more of:
 a patella,
 a bony protrusions at an end of a tibia, and
 a bony protrusions at an end of a femur.

16. The system according to claim 13, wherein:
the body armor comprises a back protector,
the first body area comprises a core spine area, and
the second body area comprises an area further away from a spine than the core spine area.

17. The system according to claim 1, wherein the second geometry comprises a second re-entrant geometry, different from the first re-entrant geometry.

18. The system according to claim 1, wherein cells of the second plurality of cells comprise straight walls.

19. The system according to claim 1, wherein the elastomeric material comprises a strain rate sensitive material.

20. The system according to claim 1, wherein the system comprises a tensile layer attached to at least one of the first plurality of cells or the second plurality of cells.

21. The system according to claim 1, wherein the system comprises a protective garment.

22. The system according to claim 1, wherein the elastomeric material comprises a thermoplastic elastomer.

23. A helmet, comprising:
a flexible energy absorbing system, comprising:
 a first plurality of cells comprising a first re-entrant geometry which extends directly from a top surface of the system to a bottom surface of the system; and
 a second plurality of cells comprising a second geometry, different from the first re-entrant geometry which extends directly from the top surface of the system to the bottom surface of the system,
wherein the first plurality of cells and the second plurality of cells comprise an elastomeric material,
wherein one or more of the first re-entrant geometry and the second geometry comprise an internal cell wall re-entrant geometry which extends directly from the top surface of the system to the bottom surface of the system,
wherein cells in the first plurality are orientated along a first axis and cells in the second plurality are orientated along a second, different axis, and
wherein one or more of the first axis and the second axis are not normal to the top surface of the system and the bottom surface of the system.

24. A method of manufacturing a flexible energy absorbing system, comprising:
forming a first plurality of cells comprising a first re-entrant geometry which extends directly from a top surface of the system to a bottom surface of the system; and
forming a second plurality of cells comprising a second geometry, different from the first re-entrant geometry which extends directly from the top surface of the system to the bottom surface of the system,
wherein the first plurality of cells and the second plurality of cells comprise an elastomeric material,
wherein one or both of the first re-entrant geometry and the second geometry comprise an internal cell wall re-entrant geometry which extends directly from the top surface of the system to the bottom surface of the system,
wherein cells in the first plurality are orientated along a first axis and cells in the second plurality are orientated along a second, different axis, and
wherein one or both of the first axis and the second axis are not normal to the top surface of the system and the bottom surface of the system.

* * * * *